United States Patent

Stone

[11] Patent Number: 5,036,825
[45] Date of Patent: Aug. 6, 1991

[54] COMPACT HIGH EFFICIENCY FUEL HEATER WITH INTEGRAL THERMOSTATIC CONTROL

[75] Inventor: Walter H. Stone, Modesto, Calif.

[73] Assignee: Parker Hannifin Corporation, Cleveland, Ohio

[21] Appl. No.: 596,110

[22] Filed: Oct. 11, 1990

[51] Int. Cl.⁵ .............................................. F02M 31/00
[52] U.S. Cl. ..................................... 123/557; 123/552
[58] Field of Search ................. 123/557, 545, 547, 552

[56] References Cited

U.S. PATENT DOCUMENTS

| | | | |
|---|---|---|---|
| 4,249,501 | 2/1981 | Ehresmann | 123/552 |
| 4,386,584 | 6/1983 | Calkins | 123/557 |
| 4,401,091 | 8/1983 | Costello et al. | 123/557 |
| 4,434,773 | 3/1989 | Granetzke | 123/557 |
| 4,527,533 | 7/1985 | Laramee | 123/557 |
| 4,754,741 | 7/1988 | Houtman | 123/557 |

*Primary Examiner*—Andrew M. Dolinar
*Assistant Examiner*—M. Macy
*Attorney, Agent, or Firm*—Ralph E. Jocke

[57] ABSTRACT

A fuel heater for maintaining the temperature of fuel delivered to an engine in a desired range includes a body (12) having a fuel inlet (14) and a fuel outlet (16). A shell and tube assembly (39) in a heat exchanger portion (20) of said body is supplied with hot coolant from the engine, which serves as a heat source. A thermostatic actuator (58) adjacent the fuel outlet extends a plunger rod (76) responsive to increasing temperature. A valve assembly includes a movable cylindrical member (66) and a conical member (72) which includes a number of orifices (74) therethrough. The body includes a conical seat (70) conforming in profile to the conical member. When the fuel is cold it passes from the inlet through an opening (38), and into the shell and tube assembly (39) to be heated. Fluid then flows through a conduit (50), past thermostatic actuator (58) and leaves the body through the outlet. With increasing fuel temperature the plunger rod moves the cylindrical member to block the opening (38) while moving the conical member off its seat providing for fuel passage through the orifices therein. Movement of the cylindrical and conical members by the thermostatic actuator maintains the fuel delivered at the outlet of the fuel heater within the desired temperature range.

8 Claims, 3 Drawing Sheets

COMPACT HIGH EFFICIENCY FUEL HEATER WITH INTEGRAL THERMOSTATIC CONTROL

TECHNICAL FIELD

This invention relates to fuel heaters. Particularly this invention relates to diesel fuel heaters used on diesel powered trucks and other vehicles to heat the fuel in cold weather.

BACKGROUND ART

Certain fuels, such as diesel fuel, thicken in cold temperatures. Under certain conditions fuels may become so viscous that they cannot flow through the fuel lines or fuel filters. Such conditions pose problems for diesel powered trucks and other types of heavy equipment which must operate in cold weather.

Many prior art devices have been used for heating fuels. Some of these devices use hot engine coolant or engine exhaust as a heat source. The hot fluid is passed through a heat exchanger to heat the fuel. These devices have advantages over other types of heaters, such as electric heaters. This is because they use "waste heat" from the engine as the heat source and do not place any additional load on the electrical system of the vehicle.

A problem with prior art fuel heaters of the hot fluid type is that they do not provide for precise control of the fuel temperature. Some of these devices heat the fuel continuously regardless of whether heating is needed. If the fuel becomes too hot, loss of engine power will result. High fuel temperatures also adversely impact the operation of electronically controlled fuel injection systems. Such systems, which are common on many newer vehicles, require that the fuel be within a certain temperature range for efficient operation.

Other types of prior art fuel heaters, particularly those that use engine coolant as a heat source, are often connected in series with the cab heater of the vehicle. This approach further contributes to imprecision in the control of the fuel temperature because heating the fuel depends on the operator's use of the cab heater. The operator may not turn on the cab heater even though it is very cold. This may occur when the engine is allowed to idle for extended periods to avoid shutting it off. This is often done in very cold weather. If the fuel heater is inoperative the fuel may become too cold to flow and stall the engine. In warm weather the cab heater may be left on resulting in overheating of the fuel.

The installation of coolant heaters in series with the cab heater of the vehicle is also cumbersome. This is because the coolant hoses often have to be run long distances to the fuel heater. This also results in lower heating efficiency due to heat loss through the hoses.

A further disadvantage of fuel heaters that use exhaust or hot coolant as heat source, is that they are usually fully on or off. These devices do not allow for slight warming of the fuel. In addition, because the amount of heat required to affect a meaningful increase in the temperature of diesel fuel is relatively high, the heat exchangers tend to be large. This increases the weight of the device and often makes finding space to mount the unit a problem.

Thus, there exists a need for a diesel fuel heater that provides more precise and reliable control of fuel temperature and is more compact and light weight.

DISCLOSURE OF INVENTION

It is an object of the present invention to provide a diesel fuel heater that achieves more precise control of the fuel temperature.

It is a further object of the present invention to provide a diesel fuel heater that control the heating of the fuel independent of the vehicle operator.

It is a further object of the present invention to provide a diesel fuel heater that is compact.

It is a further object of the present invention to provide a diesel fuel heater that is light weight.

It is a further object of the present invention to provide a diesel fuel heater that has self contained temperature controls and is easy to install.

Further objects of the present invention will be made apparent in the following Best Mode for Carrying Out Invention and the appended Claims.

The foregoing objects are accomplished by a diesel fuel heater that uses engine coolant as a heat source. The coolant is continuously supplied to the heater which is not connected in the coolant circuit with the cab heater.

The heater has a body which includes a fuel inlet and a fuel outlet. The body has a shell and tube heat exchanger portion which includes a large number of fins and small fluid passageways for providing efficient heat transfer within a small space. The hot engine coolant is supplied to the "shell" side of the heat exchanger portion. The body further includes fluid passage means for carrying fuel through the "tube" side of the heat exchanger portion. The body further includes a second fluid passage for carrying the fuel directly from the inlet to the outlet without passing through the heat exchanger portion.

A thermostatic actuator is mounted in the fuel path adjacent the outlet of the fuel heater unit. The actuator includes a plunger rod that extends from a core of the actuator in response to increasing fuel temperature.

A valve assembly mounted in the body includes a movable cylindrical member as well as a movable hollow conical member. The hollow conical member has several orifices extending therethrough. A mating seat for the conical member blocks the orifices when the conical member is in contact with the seat. The plunger rod is in supporting contact with the conical member which in turn is in supporting contact with the cylindrical member.

When the fuel is cold and heating is desirable, fuel passes into the heater from the inlet and enters a first chamber. From the first chamber, the fuel passes through a first opening into a first fluid passage through the heat exchanger portion of the body. From the heat exchanger portion, the fuel flows to a second chamber, past the thermostatic actuator and out the outlet of the heater.

As the fuel temperature increases the thermostatic actuator extends the plunger rod. The plunger rod moves the cylindrical member to block the first opening in the first chamber. This cuts off the flow of fuel to the heat exchanger portion. As the plunger rod moves the cylindrical member it also moves the conical member away from its seat. As a result, the orifices in the conical member are opened and fuel flows therethrough. The opening of the orifices enables fuel to pass directly from the inlet to the outlet without being heated.

The thermostatic actuator and valve arrangement enables the fuel heater of the present invention to assume intermediate positions in which only a portion of the fuel passing through the heater is subject to heating. This enables precise control of the fuel temperature.

BEST MODES FOR CARRYING OUT INVENTION

Figure 1:
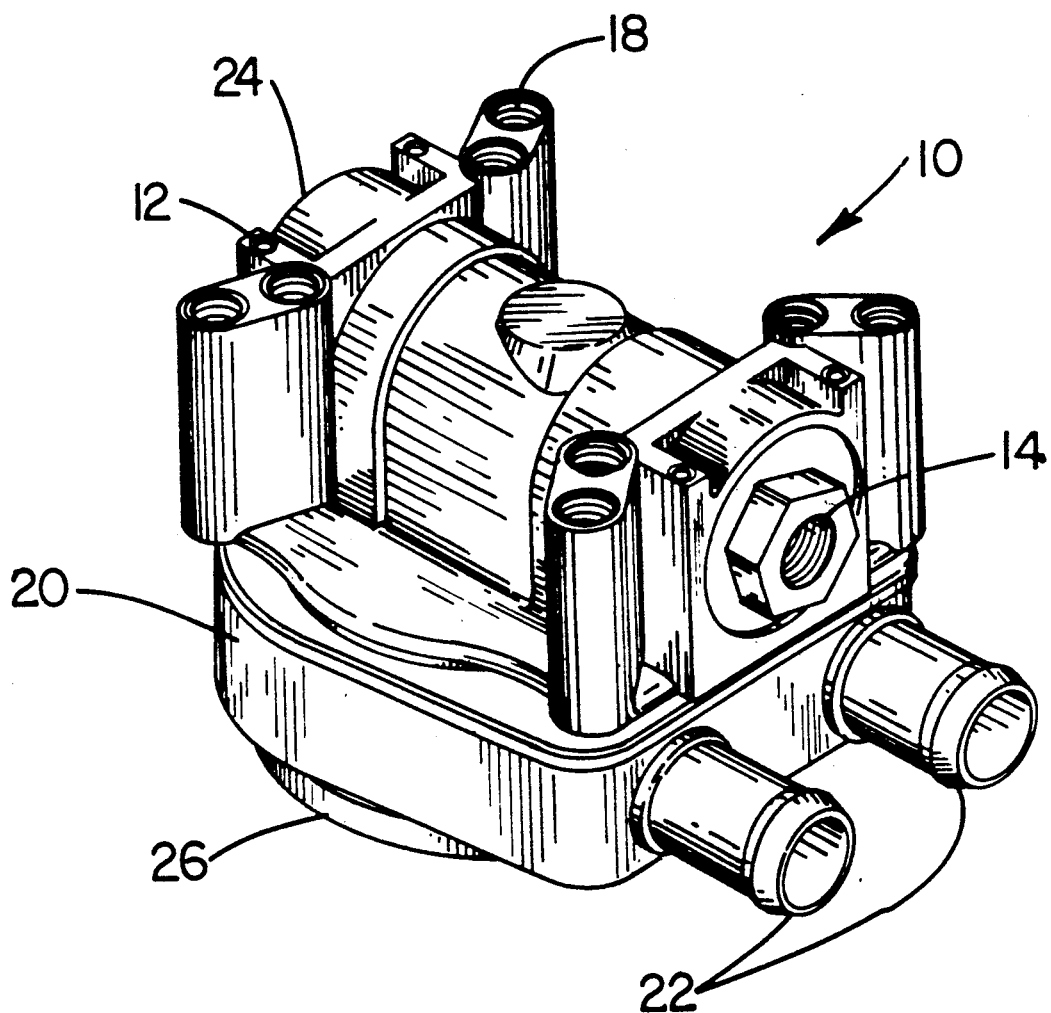
FIG. 1 is an isometric view of the preferred form of the fuel heater of the present invention.

Referring now to the drawings and to particularly FIG. 1, there is shown therein a diesel fuel heater of the preferred embodiment of the present invention generally indicated 10. The heater includes a body 12 which has a fuel inlet 14 and an opposed fuel outlet 16 (see FIG. 2). Body 12 includes a number of mounting holes 18 which facilitate mounting it to a vehicle.

Figure 2:
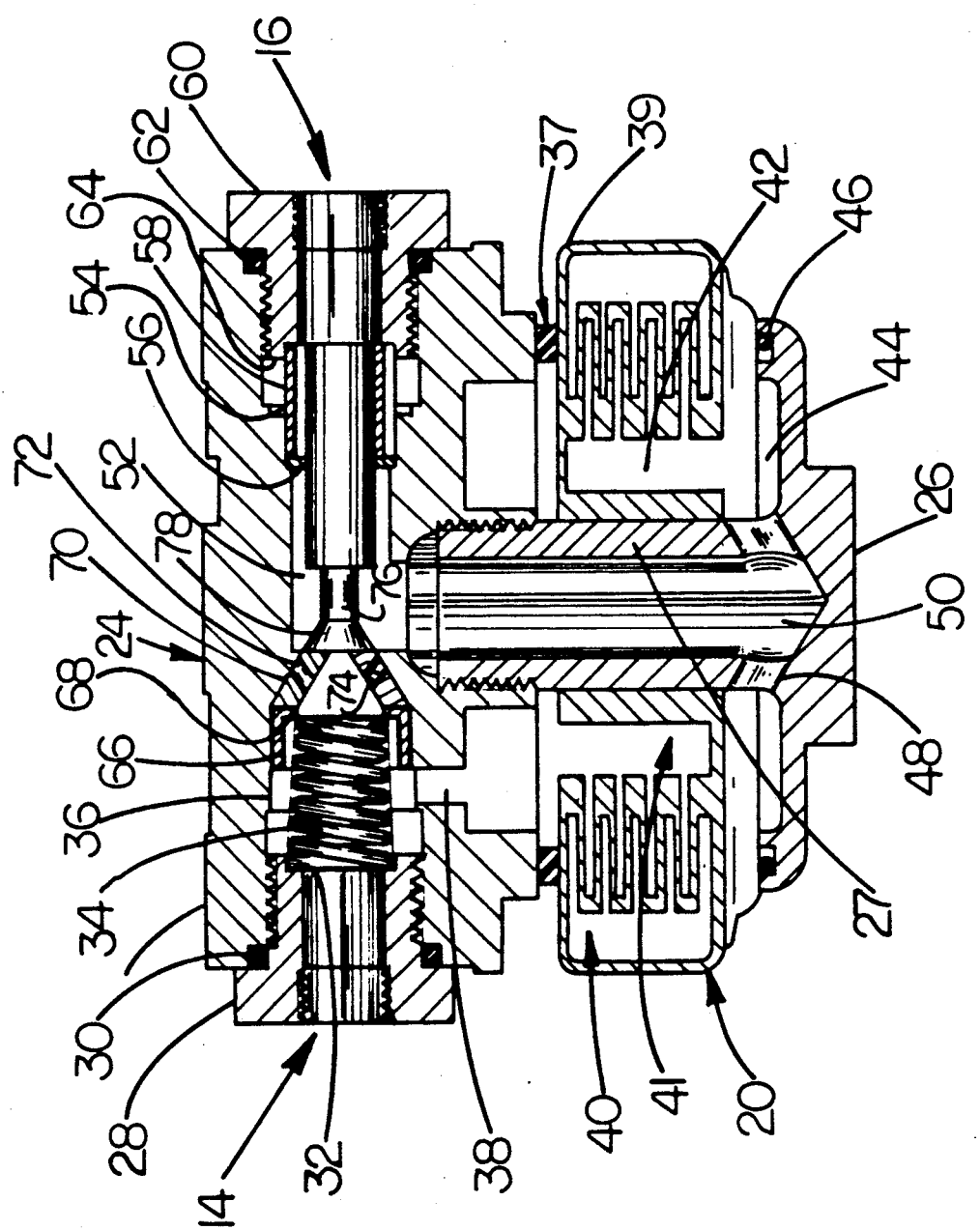
FIG. 2 is a cross sectional schematic view of the fuel heater.

Body 12 includes a heat exchanger portion 20. Heat exchanger portion 20 includes two hose connections 22 for connecting the heater to coolant hoses of a vehicle coolant system. Body 12 also includes an upper cast portion 24. The heat exchanger includes a cap 26. As shown in FIG. 2, cap 26 includes a central portion 27 which threads into case body portion 24 and holds the portions of body 12 together.

Cast body portion 24 accepts a threaded fitting 28 which surrounds the inlet 14. An o-ring 30 maintains fitting 28 and body portion 24 in fluid tight relation. Fitting 28 includes a recess 32 at the inner face that supports a spring 34. The function of spring 34 is later discussed.

Body portion 24 includes a first cylindrical chamber 36. First chamber 36 includes a first opening 38 which is open to the heat exchanger portion 20 of the body.

Heat exchanger portion 20 includes a shell and tube assembly 39 in which hot coolant flows in an outer area 40, or "shell" area, and fuel flows in an inner area 41, or "tube" area. A gasket 37 maintains a fluid tight seal between body portion 24 and the shell and tube assembly 39.

As shown schematically in FIG. 2, fuel enters the tube area of the assembly and travels in a circular path through the tube area to an outlet manifold 42. From the outlet manifold 42, fuel enters a lower chamber 44 located between the shell and tube assembly 49 and the interior face of end cap 26. On o-ring 46 maintains a fluid tight seal between the shell and tube assembly and end cap 26.

In the preferred form of the invention, the shell and tube assembly is a commercially available heat exchanger sold by Modine Manufacturing for use as a water cooled engine oil cooler. However, in other embodiments of the invention, other types of heat exchangers may be used. In the preferred form of the invention, this heat exchanger is used because it includes a substantial number of small passages and fins which provide an acceptable level of heat exchange between the coolant and the fuel within a compact space.

The end cap 26 includes a pair of internal ports 48 which extend between lower chamber 44 and a central conduit 50. Central conduit 50 extends through the central portion 27 of the end cap. The central conduit 50 is open to second chamber 52 in cast body portion 24.

Body portion 24 is separated from second chamber 52 by a step 56. A thermostatic actuator 58, the operation of which is later explained, is positioned in the third chamber. An outlet fitting 60 surrounds outlet 16 and is threaded into body portion 24. An o-ring 62 maintains outlet fitting 60 and body portion 24 in fluid tight relation. An inner face 64 of outlet fitting 60 abuts thermostatic actuator 58 to hold it in position between the outlet fitting and step 56.

An open cylindrical member 66 is positioned in first chamber 36. Spring 34 is in contact with a step 68 on cylindrical member 66 and biases it to the right as shown in FIG. 2. Cylindrical member 66 is sized to be longitudinally movable in first chamber 36.

First chamber 36 is in fluid connection with second chamber 52 in cast body portion 24 through a conical seat 70 which has an opening therein. A conical member 72 is sized for acceptance by conical seat 70. Conical member 72 includes a plurality of orifices 74 which extend therethrough. Orifices 74 are positioned so that they are blocked by seat 70 when conical member 72 and set 70 are in abutting relation.

Figure 3:
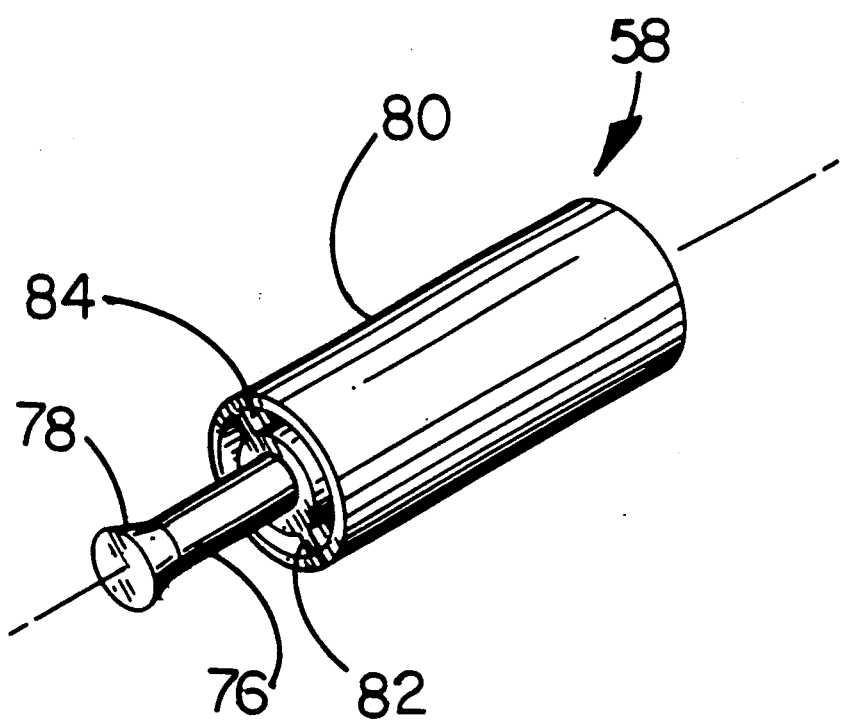
FIG. 3 is an isometric view of the thermostatic actuator of the fuel heater.

Thermostatic actuator 58 includes a plunger rod 76. Plunger rod 76 has a broad heat 78 which is in abutting contact with conical member 72. As shown in FIG. 3, thermostatic actuator 58 includes a housing 80. An actuator core 82 is supported by a pair of vanes 84 which extend from the inside face of the housing. Fuel is enables to flow between the housing and the core of the thermostatic actuator so the core is maintained at the temperature of the fuel. In the preferred form of the invention, core 82 contains a wax material that expands with increasing temperature. The expanding wax moves the plunger rod outward in response to increasing temperature. A unit of this type is commercially available from the Robertshaw Controls Company and is called a "power pill" thermostatic assembly. In other embodiments of the invention, other thermosensitive actuators may be used.

In operation, fuel enters the fuel heater through inlet 14. If the fuel is cold, thermostatic actuator 58 will be in the position shown in FIG. 2. Fuel delivered at the inlet enters the first chamber 36 and travels through opening 38 into the shell and tube assembly 39 where it is heated by heat transferred from the engine coolant.

The heated fuel passes from the shell and tube assembly through outlet manifold 42 and enters the lower chamber 44. From the lower chamber fuel travels through ports 48 in the end cap and travels up conduit 50. From conduit 50, fluid enters second chamber 52, travels through the thermostatic actuator 58 and leaves the heater through outlet 16. The path for the fuel through the heat exchanger portion 20 of the body of the unit constitutes a first fluid passage means through the heater body.

Thermostatic actuator 58 is a temperature sensing means that extends plunger rod 76 as the temperature of the fuel passing the actuator increases. As plunger rod 76 extends, it controls the positions of conical member 72 and cylindrical member 66, which together with seat 70, comprise valve means.

As the fuel temperature increases, plunger rod 76 moves outward from core 82 of thermostatic actuator 58. The plunger rod overcomes the force of spring 34 and moves cylindrical member 66 and conical member 72 to the left of the position shown in FIG. 2. Conical member 72 is thus moved off its seat 72, and orifices 74 are opened so that fuel may flow therethrough. This comprises a second fluid passage means through which fuel passes directly from the inlet 14 to the outlet 16 without heating of the fuel.

When thee fluid paths through the conical member 72 are opened, the cylindrical member 66 moves to begin blocking opening 38. When the fuel reaches the desired temperature, the plunger rod 76 is fully extended and opening 38 is blocked. In this condition all of the fuel passes directly from the inlet to the outlet without being heated.

If the fuel again becomes too cold, the contraction of the wax material inside the thermostatic actuator enables plunger rod 76 to retract in response to the force applied by spring 34. As a result, cylindrical member 66 moves to the right as shown in FIG. 2, enabling opening 38 to accept fluid from the first chamber. As a result, the fuel will again be heated to the desired temperature.

In other embodiments of the invention, the heater may be combined in a single housing with a fuel filter and/or water separator. In such embodiments the fuel is passed through a filter or separator apparatus positioned in the fuel path between the valve means and the thermostatic actuator. In such embodiments, if the fuel requires heating, it will be passed through the heat exchanger portion before the filter and/or separator. The heating lowers the viscosity enabling the fuel to flow more readily through filter or separator media. The thermostatic actuator positioned adjacent the outlet of the device operates to heat the fuel enough to compensate for heat losses as the fuel passes through the filtration and/or separation apparatus. Such construction also presents the advantage that the actuator is exposed only to clean fuel downstream of filtration and/or separation. This lowers the probability that contaminants will clog small passageways in the actuator where fuel flows between the cylindrical housing and the core. In other embodiments of the invention, the heater may be combined in series in a single housing with filtration and/or separation apparatus.

Thus the new diesel fuel heater achieves the above stated objectives, eliminates difficulties encountered in the use of prior devices, solves problems and attains the desirable results described herein.

In the foregoing description, certain items have been used for brevity, clarity and understanding, however, no unnecessary limitations are to be implied therefrom because such terms are for descriptive purposes and are intended to be broadly construed. Moreover, the descriptions and illustrations given are by way of examples and the invention is not limited to the exact details shown or described.

Having thus described the features, discoveries and principles of the invention, the manner in which it is constructed and operated and the advantages and useful results obtained; the new and useful structures, devices, elements, arrangements, parts, combinations, systems, equipment, operations and relationships are set forth in the appended claims.

I claim:

1. A fuel heater for maintaining fuel delivered to an engine within a desired temperature range;
    having a body with an inlet and an outlet;
    heat exchanger means for delivering heat from a heat source;
    first fluid passage means in said body for passing fuel from the inlet to the outlet through said heat exchanger means;
    second fluid passage means disposed of said heat exchanger means for passing fuel from the inlet to the outlet through said body;
    valve means in said body for selectively directing fuel to said first or second fluid passage means; and,
    thermostatic actuator means in a fuel path in said body in operative connection with said valve means for controlling said valve means responsive to fuel temperature;
    wherein an improvement comprises:
        a first opening to said first fluid passage means;
        a seat in said body, said second fluid passage means extending through a fluid opening in said seat, said thermostatic actuator means including an axially movable plunger rod extending through said fluid opening in said seat, said plunger rod moveable responsive to temperature;
        said valve means including a moveable member means for movement between a first position and a second position by said plunger rod, said moveable member means including at least one flow passage therethrough; and,
        wherein in the first position of said moveable member means said flow passage is adjacent said seat and flow therethrough is prevented, and said member means is disposed of said first opening enabling flow through said first fluid passage means; and
        wherein in the second position of said moveable member means said flow passage is disposed of said seat enabling flow through said second fluid passage means, and said member means is adjacent said first opening preventing flow through said first fluid passage means.

2. The diesel fuel heater according to claim 1 wherein said body further comprises a second chamber intermediate of said valve means and said thermostatic actuator, said second chamber including a second opening for accepting heated fuel from said heat exchanger means.

3. The diesel fuel heater according to claim 2 wherein said body further comprises:
    said seat being conical and being located between first and second chambers; and
    said valve means further comprises a conical portion accepted by said seat, said conical portion including at least one orifice therethrough, said conical portion movable responsive to said plunger rod;
    whereby when said first movable member is in said first position, said orifice of said conical portion is blocked by said seat and fuel is enabled to flow through said heat exchanger means; and when said first movable member is in the second position, said orifice of said conical portion is open and fuel is enabled to bypass said heat exchanger means.

4. The diesel fuel heater according to claim 3 wherein said first member is a cylindrical member, and said valve means includes a conical member, said conical portion on said conical member, and said conical member is in supporting contact with said cylindrical member, and wherein said plunger rod is in contact with said conical member.

5. The diesel fuel heater according to claim 4 wherein said body further comprises a third chamber adjacent said outlet, said thermostatic actuator mounted in said third chamber; and said plunger rod extends collinear with said inlet and outlet through said second chamber to said conical member.

6. The diesel fuel heater according to claim 5 wherein said actuator includes a temperature expansible substance that expands with increasing temperature, said substance causing movement of said plunger rod; said plunger rod moving said first movable member to the second position in response to an increase in temperature.

7. The diesel fuel heater according to claim 6 wherein said heat exchanger means is a shell and tube heat exchanger and wherein the heat source is a hot fluid from said engine.

8. The diesel fuel heater according to claim 7 wherein the hot fluid is hot engine coolant.

* * * * *